Dec. 8, 1931.  W. A. CHRYST  1,835,013
SHOCK ABSORBER
Filed May 1, 1930
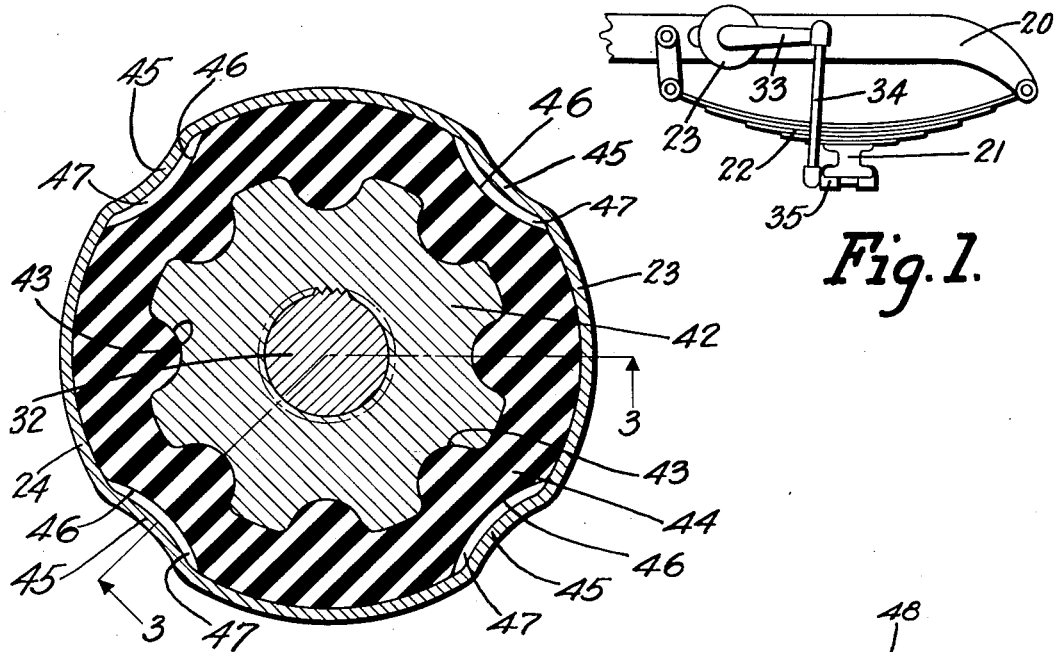
Fig. 1.
Fig. 2.
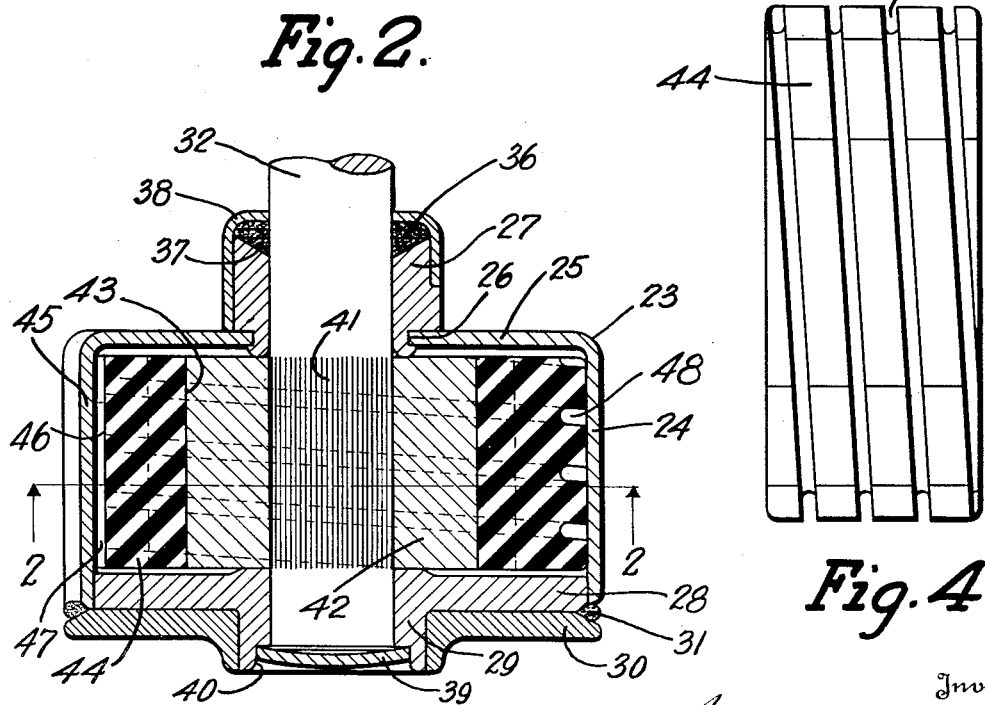
Fig. 3.
Fig. 4.
Inventor
William A. Chryst
By
Spencer, Hardman and Wm
Attorneys Patented Dec. 8, 1931

1,835,013

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF OHIO

SHOCK ABSORBER

Application filed May 1, 1930. Serial No. 448,933.

This invention relates to improvements in shock absorbers.

It is among the objects of the present invention to provide a shock absorber of simple structure and design which is inexpensive to manufacture and which is adapted to control the approaching and separating movements of two relatively movable members, for instance, the frame and axle of a motor vehicle.

Another object of the present invention is to provide a shock absorber having two relatively movable members and a resilient body attached to one of said members and grippingly engaging the other of said members whereby relative motion between said members is resisted.

Further objects and advantages of the present invention will be apparent from the following description, reference being had to the accompanying drawings wherein a preferred embodiment of one form of the present invention is clearly shown.

In the drawings:

Fig. 1 is a fragmentary side view of a vehicle chassis with a shock absorber embodying the present invention applied thereto. The road wheels of the vehicle have been omitted in this view for the sake of clearness.

Fig. 2 is a sectional view of a shock absorber taken along the line 2—2 of Fig. 3.

Fig. 3 is a sectional view taken along the line 3—3 of Fig. 2.

Fig. 4 is a detail elevational view of the resilient body of the device.

Referring to the drawings, the numeral 20 designates the frame of the vehicle which is supported upon the axle 21 by springs 22.

The shock absorber comprises a housing or casing 23, cup-shaped, having an annular wall 24 and an end wall 25. An opening 26 in the end wall, substantially coaxial of the annular wall 24, has the bearing member 27 secured therein. A disc 28 fits into the open end of the casing 23, said disc presenting a bearing 29. The disc 28 is supported in the housing 23 by an end cover member 30, which is secured to the annular wall 24 of the housing in any suitable manner, preferably by welding, as designated by the numeral 31.

This cover 30 has a central bore which receives one end of the bearing portion 29 of the disc 28, thereby supporting said disc.

Bearings 27 and 29 rotatably support the shaft 32, one end of which extends outside the casing and has the shock absorber operating arm 33 provided thereon. The free end of this arm is swivelly connected to one end of the link 34. The opposite end of the link is attached to the axle 21 by the clamp 35. A series of packing washers or rings 36 surround shaft 32 adjacent the sloping end 37 of the bearing 27, these packing washers being urged into engagement with the shaft and with the sloping end 37 of the bearing 27 by a packing gland 38 which fits tightly about the bearing 27. A Welsh plug 39 closes the opening 40 in the bearing portion 29 of disc 28, thereby covering the one end of shaft 32.

Shaft 32 has serrations 41 provided thereon, by which a core 42, of any suitable material, is attached to the shaft 32 so as to rotate therewith. A shown in Fig. 2, this core 42 has transverse grooves 43 provided in its outer, peripheral surface. Core 42 has a covering 44 of resilient material fitting about its grooved, peripheral surface, the outer peripheral surface of the core, as shown in Fig. 2, grippingly engaging the inner surface of the annular wall 24 of the housing 23.

As shown in Fig. 2, the annular wall 24 of the housing has inwardly extending humps 45, spaced in any suitable manner. The resilient body or covering 44 of the core 42 has a plurality of recesses 46, each curved so as to have a cylindrical contour coinciding with the humps 45 of the housing wall 24. When the core 42 and shaft 32 are in normal position relative to the housing 23, the recesses 46, provided in the outer peripheral surface of the resilient covering or body about said core 42, each will align with a respective hump 45. The recesses 46 being of greater dimensions than their respective humps 45, that is, the curvature of each recess 46 being greater than that of its respective hump 45, a space will be provided between each juxtaposed hump and recess 45 and 46 respectively. These spaces are designated by the numeral 47.

The flexible body or covering 44 has an annular groove 48 spirally formed in its peripheral surface, providing space for the displacement of the flexible material when the device is in operation.

The striking of obstructions or bumps in the roadway by the road wheels, not shown, will cause the axle 21 to be moved upwardly toward the frame 20, compressing the springs 22. This movement of the axle 21 toward the frame 20 will cause link 34 to operate the shock absorber operating arm 33 in a counter-clockwise direction, and thus shaft 32 and its core 42 will be moved likewise. This movement of the core 42 and its resilient covering in a counter-clockwise direction will be resisted by the gripping effect of the peripheral surface of the resilient body against the inner surface of the annular wall 24 of the housing 23. This resistance by the gripping effect mentioned will remain substantially constant until the recesses 46 in the resilient body have been moved out of alignment with the respective humps 45 on the housing. As soon as the outer peripheral surface of the resilient body moves into engagement with a hump 45, then the resistance to this movement will gradually be increased for, as the resilient body moves over these humps, portions of said body will need be displaced and consequently such displacement will offer increased resistance to the rotating motion of the resilient body.

As soon as the spring reaches the limit of its compression, due to the particular bump being struck it will return toward normal load position, thus the movement of the shock absorber is reversed and the core will rotate the flexible body 44 clockwise and said flexible body moving away from the humps 45, the first movement in this direction will be comparatively highly resisted, said resistance however being gradually decreased as the recesses 46 in the flexible body approach alignment with their respective humps 45.

From the aforegoing it may be seen that while spaces 47 are maintained between the hump and recessed portions of the housing and flexible body respectively, a comparatively free action of the shock absorber results. However, as these spaces 47 are reduced in size by the movement of the recessed portions of the flexible body out of alignment with the respective humps, resistance will gradually be increased. As has been mentioned before, grooves 48 in the flexible body merely provide spaces into which displaced flexible material may flow while under pressure.

The present device provides a sturdy shock absorber of simple structure, which may be produced commercially at a minimum expense of time and material and which does not require lubrication or any special attention in the field.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a housing having an annular wall; inwardly extending humps in said annular wall; a shaft rotatably supported, coaxially of said housing; and a resilient disc attached to the shaft and fitting snugly into the housing, said disc having recesses in its peripheral surface, each recess, when the disc is in normal position relative to the housing, being adjacent a hump in the housing wall and being of substantially greater dimensions than its respective hump, whereby a space is provided between each recess and hump.

2. A shock absorber comprising, in combination, a housing having an annular wall; inwardly extending humps in said annular wall; a shaft rotatably supported, coaxially of said housing; a core secured to the shaft, said core having transverse grooves in its peripheral surface; and a resilient body attached about the outer, grooved surface of the core, the peripheral surface of the resilient body yieldably gripping the inner surface of the annular wall of the housing.

3. A shock absorber comprising, in combination, a housing having an annular wall; inwardly extending humps in said annular wall; a shaft rotatably supported, coaxially of said housing; a core secured to the shaft, said core having serrations in its peripheral surface; a covering of resilient material about the serrated surface of the core, said covering yieldably gripping the inner surface of the annular wall of the housing, said covering also having curved recesses in its outer, peripheral surface, each recess being in juxtaposition to a hump in the annular wall of the housing when the core and shaft are in normal position relative to the housing, whereby a space is provided between each recess and its respective hump on the housing.

4. A shock absorber comprising, in combination, a cup-shaped housing having an annular wall and an end wall; a bearing supported in a central opening in the end wall; a disc fitting into the open end of the housing, said disc providing a bearing in coaxial alignment with the first mentioned bearing; a cover secured to the open end of the housing, said cover supporting the disc; a shaft journalled in said bearings; a core on said shaft; and a cover of resilient material about said core, the outer surface of said core grippingly engaging the inner surface of the annular wall of the housing.

5. A shock absorber comprising, in combination, a cup-shaped housing having an annular wall and an end wall; a bearing supported in a central opening in the end wall;

a disc fitting into the open end of the housing, said disc providing a bearing in coaxial alignment with the first mentioned bearing; a cover secured to the open end of the housing, said cover supporting the disc; a shaft journalled in said bearings; a core on said shaft; and a cover of resilient material about said core, the outer surface of said cover grippingly engaging the inner surface of the annular wall of the housing; and inwardly extending humps on the annular wall of the housing, normally fitting into recesses provided in the outer surface of the resilient cover of the core.

In testimony whereof I hereto affix my signature.

WILLIAM A. CHRYST.